US009527265B2

(12) United States Patent
Leiser et al.

(10) Patent No.: US 9,527,265 B2
(45) Date of Patent: Dec. 27, 2016

(54) POLYETHYLENE TEREPHTHELATE PART BONDED TO POLYESTER AND POLYCARBONATE ALLOY PART

(71) Applicant: Hewlett-Packard Development Company, L.P., Houston, TX (US)

(72) Inventors: Judson M. Leiser, Corvallis, OR (US); Karen A. St. Martin, Corvallis, OR (US); Josh Cooper, Corvallis, OR (US); Iskandar Bin Isehak, Singapore (SG); Holly F. Junge, Corvallis, OR (US)

(73) Assignee: HEWLETT-PACKARD DEVELOPMENT COMPANY, LP., Houston, TX (US)

( * ) Notice: Subject to any disclaimer, the term of this patent is extended or adjusted under 35 U.S.C. 154(b) by 0 days.

(21) Appl. No.: 14/767,403

(22) PCT Filed: Feb. 12, 2013

(86) PCT No.: PCT/US2013/025670
§ 371 (c)(1),
(2) Date: Aug. 12, 2015

(87) PCT Pub. No.: WO2014/126547
PCT Pub. Date: Aug. 21, 2014

(65) Prior Publication Data
US 2015/0375483 A1 Dec. 31, 2015

(51) Int. Cl.
*B29C 65/00* (2006.01)
*B41J 2/175* (2006.01)
(Continued)

(52) U.S. Cl.
CPC .......... *B32B 27/08* (2013.01); *B29C 65/1635* (2013.01); *B29C 66/43* (2013.01); *B29C 66/71* (2013.01);
(Continued)

(58) Field of Classification Search
CPC ... B41J 2/1623; B41J 2/17503; B41J 2/17559; B41J 2/246; B41J 2/1752; B41J 2/17553; B41J 29/13; B29C 65/16; B29C 66/712; B29C 66/43; B29C 66/71; B29C 66/721; B29C 66/73921; B29C 66/7212; B29C 66/1222; B29C 66/1224; B29C 66/81267; B29C 66/8322; B29C 66/1122; B29C 65/1654; B29C 65/1635; B29C 65/02; B29C 65/1677; B32B 27/08; B32B 27/36; B32B 27/365; B32B 7/04; B32B 2250/244; B32B 2457/00; B32B 2262/106; B29K 299/0027; B29L 2031/7678
(Continued)

(56) References Cited

U.S. PATENT DOCUMENTS 5,203,940 A 4/1993 Krone
7,960,012 B2 6/2011 Kihara et al.
(Continued)

FOREIGN PATENT DOCUMENTS

CN 101906243 A * 12/2010 .......... B29C 47/827
JP 2001026656 1/2001
(Continued)

OTHER PUBLICATIONS

PCT Search Report and Written Opinion for PCT/US2013/025670, mailed Nov. 12, 2013, 11 pgs.

*Primary Examiner* — Julian Huffman
*Assistant Examiner* — Sharon A Polk
(74) *Attorney, Agent, or Firm* — Dicke Billig & Czaja PLLC

(57) ABSTRACT

A device has a first part including polyethylene terephthelate (PET) with a fiber fill and a second part bonded to the first part. The second part includes an alloy of polyester and polycarbonate. The first and second part may be bonded together by placing the first part and the second part in contact with one another and heating the second part to bond the second part to the first part.

14 Claims, 2 Drawing Sheets

(51) Int. Cl.
 *B32B 27/08*  (2006.01)
 *B29C 65/16*  (2006.01)
 *B41J 29/13*  (2006.01)
 *B32B 7/04*  (2006.01)
 *B32B 27/36*  (2006.01)
 *B29L 31/00*  (2006.01)
 *B29C 65/02*  (2006.01)

(52) U.S. Cl.
 CPC ......... *B29C 66/712* (2013.01); *B29C 66/721* (2013.01); *B29C 66/73921* (2013.01); *B32B 7/04* (2013.01); *B32B 27/36* (2013.01); *B32B 27/365* (2013.01); *B41J 2/1752* (2013.01); *B41J 2/17553* (2013.01); *B41J 2/17559* (2013.01); *B41J 29/13* (2013.01); *B29C 65/02* (2013.01); *B29C 65/1654* (2013.01); *B29C 65/1677* (2013.01); *B29C 66/1122* (2013.01); *B29C 66/1222* (2013.01); *B29C 66/1224* (2013.01); *B29C 66/7212* (2013.01); *B29C 66/81267* (2013.01); *B29C 66/8322* (2013.01); *B29K 2995/0027* (2013.01); *B29L 2031/7678* (2013.01); *B32B 2250/244* (2013.01); *B32B 2262/106* (2013.01); *B32B 2457/00* (2013.01)

(58) Field of Classification Search
 USPC .......................................................... 347/86
 See application file for complete search history.

(56) References Cited

U.S. PATENT DOCUMENTS

| | | |
|---|---|---|
| 8,008,387 B2 | 8/2011 | Miyamoto |
| 8,142,900 B2 | 3/2012 | Sakata |
| 2004/0084140 A1 | 5/2004 | Kobayashi |
| 2005/0099449 A1* | 5/2005 | Frasure ................ B41J 2/17506 347/20 |
| 2005/0119377 A1 | 6/2005 | Ishii et al. |
| 2005/0217790 A1 | 10/2005 | Joachimi et al. |
| 2007/0135587 A1 | 6/2007 | Matsushima et al. |
| 2009/0012610 A1* | 1/2009 | Olson ............... A61M 25/0009 623/11.11 |
| 2009/0208721 A1* | 8/2009 | Tsuchiya ........... B29C 45/14786 428/220 |
| 2010/0092767 A1* | 4/2010 | Naito .................... B29C 59/14 428/336 |
| 2011/0200791 A1 | 8/2011 | Kugelmann et al. |
| 2011/0279590 A1* | 11/2011 | Johnson ............... B41J 2/16535 347/86 |
| 2012/0103714 A1 | 5/2012 | Choi et al. |
| 2012/0204966 A1* | 8/2012 | Leiser ................... B41J 2/1752 137/15.01 |

FOREIGN PATENT DOCUMENTS

| | | |
|---|---|---|
| JP | 2003292752 | 10/2003 |
| JP | 2004315805 | 11/2004 |
| JP | 2008050598 | 3/2008 |

\* cited by examiner

POLYETHYLENE TEREPHTHELATE PART BONDED TO POLYESTER AND POLYCARBONATE ALLOY PART

BACKGROUND

Many articles are made up of plastic parts. The various plastic parts of such assemblies are joined together using many different techniques. Some processes for bonding plastic parts together involve heating the parts so that the desired portions of the parts reach a temperature at which they melt and bond together.

One technique for bonding plastic parts together is laser welding, wherein objects to be joined have different levels of light transmission at the wavelength of the laser being used. One part is at least partially transparent to the wavelength of the laser light and the other part absorbs the laser light. Surfaces to be joined are brought together and a laser beam is directed at the proper location of the relatively transparent object such that it passes through the first object and irradiates the second object, causing the first and second objects to be welded together.

DETAILED DESCRIPTION

Figure 1:
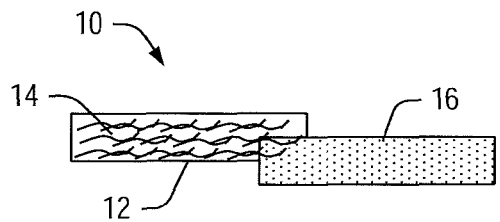
FIG. 1 is a block diagram conceptually illustrating an example of a device in accordance with the present disclosure.

In the following detailed description, reference is made to the accompanying drawings which form a part hereof, and in which is shown by way of illustration specific examples. In this regard, directional terminology, such as "top," "bottom," "front," "back," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various examples described herein may be combined with each other, unless specifically noted otherwise.

Assemblies having plastic parts often include parts reinforced with fibers, such as glass or carbon fiber. Such fiber-reinforced plastic materials can be difficult to bond to other plastic parts with techniques such as laser welding. As the fiber filler is added to the material to be welded, the intermixing of the polymer resins can be compromised, especially when high loadings of fiber are used. The fibers can make a "mat" at the surface of the molded material that acts as a barrier to the interflow of the resins when they are melted, thus interfering with the fusion of the two parts.

Further, laser welding processes require that one piece be transmissive to the laser light wavelength and that the other piece be adequately absorbent of that wavelength. This allows the weld zone to reach a desired temperature where adequate heat energy is conducted to the transmissive part to bring it to the melt temperature.

The laser light transmissive material must also be compatible with the resin of the fiber-filled part so that the molecules of both parts will interlock and create a true fused weld. Still further, the parts must meet any other constraints required of the finished assembly such as chemical compatibility, hermeticity, cost, etc. For example, in the case of an ink jet printing system the plastics must be chemically compatible with the ink used in the system.

Polyethylene terephthalate (PET) is a frequently used material for plastic assemblies in many applications, such as ink jet printers. It is relatively inexpensive, compatible with many materials including typical ink jet printer fluids, and is available as a recycled material. PET is available in a fiber-filled form, having glass or carbon fiber fill, for example. A limited number of plastic materials can be satisfactorily welded to an opaque, laser light absorbent PET, including relatively clear polyesters or copolyesters that are transparent to the appropriate laser light wavelengths, (typically 808 nm or 980 nm).

Copolyester and polyester generally are good materials for welding to PET. However, they sometimes do not adequately adhere to carbon fiber-loaded PET, and have sometimes been found to either be negatively affected by ink or have a negative effect on ink used in ink jet printing. A material including polycarbonate will adhere to the carbon fiber of the reinforced PET. However, plastics with 50% or more polycarbonate can be prone to crack and craze problems that lead to leaking in applications involving fluids such as ink jet printing.

The present disclosure relates generally to a device and method wherein one part including a fiber-filled PET is bonded to another part. FIG. 1 conceptually illustrates an example of a device 10 that has a first part 12 including PET with a fiber fill 14, and a second part 16 bonded to the first part 12. In certain implementations, the second part 16 is an alloy of polyester and polycarbonate.

Figure 2:
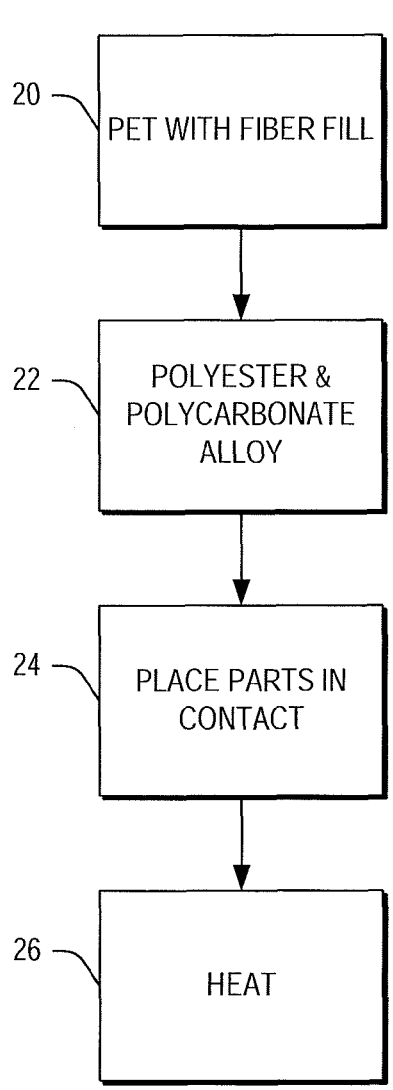
FIG. 2 is a flow diagram illustrating an example of a method for producing a device such as the device illustrated in FIG. 1.

FIG. 2 is a flow diagram broadly illustrating a method for producing the device 10. In blocks 20 and 22 the first part 12 including PET with a fiber fill and the second part 16 including an alloy of polyester and polycarbonate are provided, and placed in contact with one another in block 24. Pressure is applied to the parts and in block 26 the second part 16 is heated to bond the second part 16 to the first part 12.

In some implementations, the first part 14 has a carbon fiber fill, which in some examples is about 18% carbon fiber fill by weight. The second part 16 is a polyester and polycarbonate alloy that has about 45% or less of polycarbonate, for example. In certain implementations, the second part is an alloy of about 75% polyester and about 25% polycarbonate. Examples of suitable first and second parts are Vypet VNT518CF and Vypet VNT 7525 LW, respectively, available from Lavergne Group (www.lavergne.ca).

Figure 3:
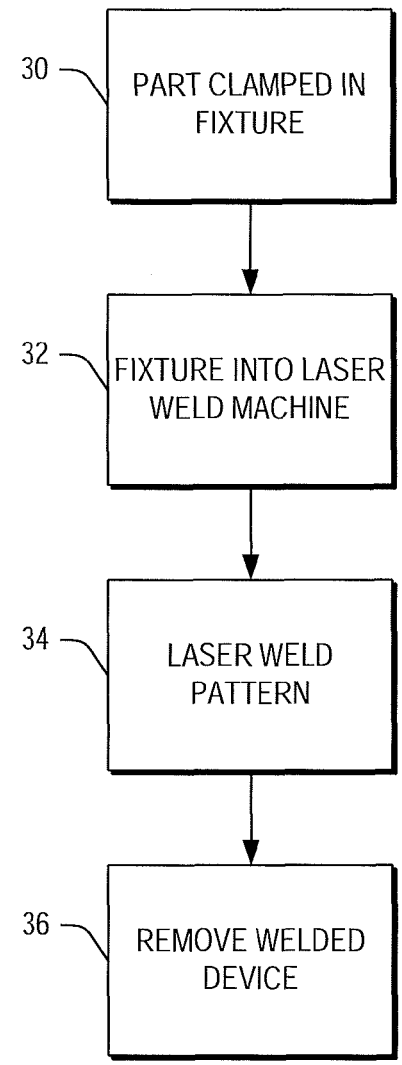
FIG. 3 is a flow diagram illustrating examples of further aspects of the method shown in FIG. 2.

FIG. 3 is a flow diagram illustrating examples of further aspects of the method shown in FIG. 2. The first part 12 is placed into a fixture of laser welding machine and the second part 16 is placed on top of the first part 12 and the parts are clamped together with a heat transmissive plate in block 30. In the example of FIG. 3, the first part is a structural monopiece of fiber-reinforced PET that is absorbent to the desired laser wavelength, and the second part is a plate of 75% polyester and 25% polycarbonate alloy that is generally transmissive to the laser wavelength. The fixture with the clamped-together plastic parts 12,16 enters a laser weld machine in block 32, where the parts are further clamped to place pressure on the parts, and a laser beam traces over the desired weld pattern in block 34. After cooling, the clamp is released and the welded device is removed in block 36.

In some implementations, the first and second parts 12, 16 are portions of a fluidic interface arranged to connect a fluid ejection device to a fluid cartridge. For example, the fluid cartridge could be an ink cartridge for an ink jet printer, and the fluidic interface thus would provide the interface for connecting the ink cartridge to a print head of the ink jet printer for ejecting ink as desired to print an image.

Figure 4:
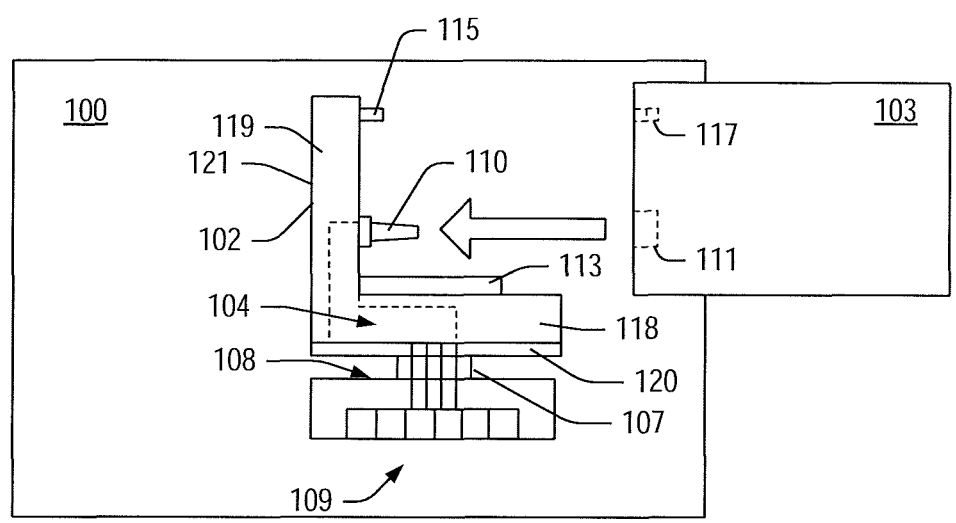
FIG. 4 is a block diagram conceptually illustrating an example of a fluid ejection device.

FIG. 4 illustrates an example of such a fluidic interface 102 of a fluid ejection device 100. The fluidic interface 102 is configured for receiving a fluid cartridge 103, such as an ink cartridge for an ink jet printing system. The fluid ejection device 100 has a plurality of fluidic channels 104, which include a manifold 108 and nozzles 109. In other examples, further elements may be included, such as filtration elements, regulation elements, etc. The fluidic interface 102 is arranged to enable a fluidic connection between the fluid cartridge 103 and the nozzles 109.

The fluidic interface 102 includes a fluidic needle 110. The fluidic needle 110 is arranged to be inserted in a corresponding opening 111 of the fluid cartridge 103 to establish a fluidic connection between the cartridge 103 and the ejection device 100.

A guide 113 is provided, at a distance from the needle 110. In the example shown in FIG. 4, the guide 113 extends close to the needle 110. The guide 113 is arranged for guiding the fluid cartridge 103 for insertion of the needle 110 into the fluid cartridge 103 when the cartridge 103 is moved in the direction of the needle 110.

In some implementations, the fluidic interface 102 has multiple needles 110 for receiving multiple respective cartridges 103, wherein each cartridge 103 contains a specific predetermined fluid. For example, each cartridge contains a respective colored ink in a color ink jet printing applications. The fluid ejection device 100 is configured to eject the predetermined fluid through predetermined nozzles 109.

In the illustrated example, the interface 102 has a first electrical connector 115, and the cartridge 103 has a corresponding second electrical connector 117. The electrical connection functions to selectively activate the flow of fluid through the needle 110 and the fluidic channels 104.

The illustrated fluidic interface 102 has a horizontal leg 118 and a standing wall 119. The fluidic needle 110 comprises a cantilever construction protruding away from the standing wall 119. The guide 113 protrudes upwardly from the horizontal leg 118. In the illustrated example, the horizontal leg 118, the standing wall 119, the guide 113 and the needle 110 are all formed as a one-piece integrally molded plastic cast 121 of fiber-reinforced PET. In certain implementations, the PET includes about 18% carbon fiber fill by weight, which provides the desired rigidity and fluid-compatibility for the particular application.

Various portions of the fluidic channels 104 may be integrally molded with the horizontal leg 118 and standing wall 119. An intermediate fluidic member 120 is provided for guiding and/or sealing the fluid connection between the interface 102 and further fluid channels 107 extending between the horizontal leg 118 and the manifold 108. The further fluid channels 107 may partly extend through the intermediate fluidic member 120. The intermediate fluidic member 120 is arranged for substantially fluid-tight transportation of the fluid to the nozzles 109. In the illustrated device, the intermediate fluidic member 120 is formed from an alloy of polyester and polycarbonate, for example, an alloy of about 75% polyester and about 25% polycarbonate. In the illustrated fluid ejection device 100, the intermediate fluidic member 120 is bonded to the one-piece integrally molded plastic cast 121 by laser welding as illustrated and described in conjunction with FIGS. 1-3, for example.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device, comprising:
a first part; and
a second part bonded to the first part,
wherein, prior to bonding, the first part includes polyethylene terephthelate (PET) with a carbon fiber fill, and the second part includes an alloy of polyester and polycarbonate, and
wherein the first part is a one-piece integrally molded fluid interface configured to receive a fluid cartridge, and the second part is an intermediate fluidic member bonded to the first part.

2. The device of claim 1, wherein, prior to bonding, the first part includes PET with about 18% carbon fiber fill by weight, and the second part includes about 75% polyester and about 25% polycarbonate.

3. The device of claim 1, wherein, prior to bonding with the second part, the first part includes a one-piece integrally molded plastic cast of PET with about 18% carbon fiber fill by weight.

4. The device of claim 1, wherein the alloy includes about 45% or less of polycarbonate.

5. The device of claim 4, wherein the alloy includes about 75% polyester and about 25% polycarbonate.

6. The device of claim 1, wherein the second part is bonded to a horizontal leg of the one-piece fluid interface.

7. The device of claim 1, wherein the one-piece is a component of an ink ejection device, and wherein the fluid cartridge is an ink cartridge.

8. A method, comprising:
separately providing a first part including polyethylene terephthelate (PET) with a carbon fiber fill;
separately providing a second part including an alloy of polyester and polycarbonate;
placing the first part and the second part in contact with one another;
heating the second part to bond the second part to the first part,
wherein the first part is a one-piece integrally molded fluid interface configured to receive a fluid cartridge, and the second part is an intermediate fluidic member bonded to the first part.

9. The method of claim 8, further comprising pressing the first part and the second part together with a heat transmissive plate.

10. The method of claim 8, wherein heating the second part includes exposing the second part to a laser beam.

11. The method of claim 8, wherein, prior to bonding, the first part includes PET with about 18% carbon fiber fill by weight, and the second part includes about 75% polyester and about 25% polycarbonate.

12. The method of claim 8, wherein, prior to bonding with the second part, the first part includes a one-piece integrally molded plastic cast of PET with about 18% carbon fiber fill by weight.

13. The method of claim 8, wherein the alloy includes about 45% or less of polycarbonate.

14. The method of claim 8, wherein the alloy includes about 75% polyester and about 25% polycarbonate.

\* \* \* \* \*

UNITED STATES PATENT AND TRADEMARK OFFICE
CERTIFICATE OF CORRECTION

PATENT NO. : 9,527,265 B2
APPLICATION NO. : 14/767403
DATED : December 27, 2016
INVENTOR(S) : Judson M. Leiser et al.

Page 1 of 1

It is certified that error appears in the above-identified patent and that said Letters Patent is hereby corrected as shown below:

On the Title Page

In item (54) and in the Specification, in Column 1, Title, Line 1, delete "TEREPHTHELATE" and insert -- TEREPHTHALATE, --, therefor.

Page 2, item (57) Abstract Line 1, delete "terephthelate" and insert -- terephthalate --, therefor.

In the Claims

In Column 4, Line 22, in Claim 1, delete "terephthelate" and insert -- terephthalate --, therefor.

In Column 4, Line 48, in Claim 8, delete "terephthelate" and insert -- terephthalate --, therefor.

Signed and Sealed this
Third Day of April, 2018

Andrei Iancu
*Director of the United States Patent and Trademark Office*